United States Patent

Beale et al.

Patent Number: 5,096,497
Date of Patent: Mar. 17, 1992

[54] CEMENT COMPOSITION

[75] Inventors: James Beale, Lichfield; Peter S. Mills, Blackburn, both of England

[73] Assignee: Fosroc International Limited, Birmingham, United Kingdom

[21] Appl. No.: 476,372

[22] PCT Filed: Sep. 14, 1989

[86] PCT No.: PCT/GB89/01078

§ 371 Date: Jul. 18, 1990

§ 102(e) Date: Jul. 18, 1990

[87] PCT Pub. No.: WO90/03346

PCT Pub. Date: Apr. 5, 1990

[30] Foreign Application Priority Data

Sep. 20, 1988 [GB] United Kingdom ............... 2-22060

[51] Int. Cl.$^5$ ............................ C04B 7/22; C04B 7/32
[52] U.S. Cl. ..................................... 106/692; 106/695
[58] Field of Search ............................... 106/695, 692

[56] References Cited

U.S. PATENT DOCUMENTS

| | | | |
|---|---|---|---|
| 4,012,264 | 3/1977 | Murray et al. | 106/89 |
| 4,019,917 | 4/1977 | Murray et al. | 106/89 |
| 4,157,263 | 6/1979 | Gaines et al. | 106/89 |
| 4,481,037 | 11/1984 | Beale et al. | 106/104 |
| 4,488,909 | 12/1984 | Galer et al. | 106/89 |
| 4,798,628 | 1/1989 | Mills et al. | 106/104 |
| 4,802,922 | 2/1989 | Smart | 106/89 |
| 4,875,937 | 10/1989 | Viles | 106/104 |
| 4,957,556 | 9/1990 | Kunbargi | 106/693 |
| 4,961,787 | 10/1990 | Majumdar et al. | 106/692 |

Primary Examiner—William R. Dixon, Jr.
Assistant Examiner—Alan Wright

[57] ABSTRACT

A hardened cement is prepared by mixing together two slurries, one comprising water and a cement component and the other comprising water, beta anhydrite and calcium oxide and or calcium hydroxide. According to the invention the cement component of the first slurry comprises ferrite and $C_{12}A_7$ or $A_7A$—$CX_2$ (where X is a halogen atom) and a reactive source of silica.

14 Claims, No Drawings

CEMENT COMPOSITION

The invention relates to a cement composition and in particular to such a composition for use in the production of concrete like materials for filling cavities in underground mines and like purposes. Compositions of the invention comprise two slurries to be mixed together. The invention is based on the realisation that by selecting specific phases for the cement component of one slurry certain advantages result in terms of cost and efficiency.

According to one aspect of the invention there is provided a composition to form a hardened cement, the composition comprising two slurries to be mixed together, the first slurry comprising water and a cement component comprising ferrite and $C_{12}A_7$ or $C_{11}A_7CX_2$ (where X is a halogen atom) and a reactive source of silica, and the second slurry comprising water, beta anhydrite, calcium oxide and/or calcium hydroxide.

The cement phase of the first slurry comprises a mixture of ferrite, ("$C_4AF$") and $C_{12}A_7$ (these formulae are in cement industry nomenclature). As will be well known to those skilled in the art, the term ferrite embraces other phases based on $C_2(,A\ F)$, as well as $C_4AF$. The presence of ferrite is beneficial because it is less reactive than the $C_{12}A_7$ phase which gives the advantage of requiring less of a retarding agent to inhibit fast setting of the admixed slurries. Other cement phases typical of high alumina cements can be present and examples include CA, $C_2AS$, $C_2S$, Klein's compound and phases containing FeO or FeO itself. The ferrite and $C_{12}A_7$ preferably make up about 50%, most preferably 65% to 85% by weight of the cement component. The $C_{12}A_7$ may be replaced by $C_{11}A_7CX_2$ where X is a halogen atom. The cement component will be made from a mineral clinker in known manner.

The reactive source of silica is preferably a ground granulated blast furnace slag. The blast furnace slag may be of any known type and derived from any source. The particle size may vary widely but should be related to that of the particles of the cement component. Preferably the slag has a specific surface area of about 3000 to about 6000 $cm^2/g$. The reactive source of silica may be provided by other ingredients in whole or in part such as pozzolans, pulverised fly ash, silica fume or other glassy mixtures of lime and silica.

The reactive source of silica is preferably present in a weight ratio of 0.1 to 0.6 silica source per 1 part cement component. Sufficient should be present to ensure that strength regression does not occur after admixture of the two slurries. If more of the reactive source of silica is present, the strength of admixture will be too low to provide early pack support for an underground road.

It is preferred to add a retarding/suspending system to the first slurry. Suitable retarders include polysaccharides, glucose, fructose, lactose, sucrose and the like. Suitable suspending agents include cellulose ethers, polymers such as polyacrylamides and polyethylene oxides and polyacrylates; gums such as guar gum, xanthan gum or gum acacia; starch, hectorite, bentonite, attapulgite and the like. It is essential that the second slurry contains calcium sulphate in the form of beta anhydrite because other forms of calcium sulphate when used alone do not give satisfactory results. Hydrated forms such as Plaster of Paris or gypsum both give strengths which are too low during the initial stages of the setting process and gamma-anhydrite hydrates very rapidly in water and gives similar results to the hydrated forms.

The beta anhydrite is preferably present in the second slurry so that when the slurries are mixed it will be present relative to the cement component in a ratio of from 3:7 to 4:1 by weight.

It is essential to include calcium oxide and/or calcium hydroxide to ensure that the maximum quantity of ettringite possible is formed.

In order to obtain sufficiently rapid and sufficiently high early strength development (a minimum of the order of 0.35 $MNm^{-2}$ after 2 hours is desirable) together with high ultimate strength development when the cement composition has fully hardened, care should be taken in selecting the quantity of calcium oxide or calcium hydroxide which is used. Too little results in inadequate strength development but it is also possible to add too much with the result that the strength after one week is poor. The quantity used will be dependent on the quantity and nature of each of the other constituents which is present but in general good results are obtained when the quantity of calcium oxide and/or calcium hydroxide is from about 4 to about 8% by weight based on the weight of the cement component. The calcium oxide may be incorporated as such or as a latent source of lime such as Ordinary Portland cement.

In addition to the beta anhydrite it may be desirable to include a proportion of a suitable partially water soluble calcium sulphate such as gypsum ($CaSO_4 2H_2O$), or hemihydrate ($CaSO_4 \frac{1}{2} H_2O$), in order to increase the strength developed by the composition. The quantity of such calcium sulphate is preferably in the range of about 1 to about 6% by weight.

The slurries may include other known additives such as accelerators of which sodium carbonate in a weight ratio of about 0.5 to about 3% relative to the cement component is an example.

In practice, the slurries are usually required to be pumped and the nature of the ingredients and the water:solids ratios are selected so that the slurries can have a viscosity such that they can be pumped for a period exceeding about two hours, preferably about 12 hours after admixture.

According to a further feature of the invention, there is provided a method of producing a hardened cement containing ettringite comprising mixing the slurries defined above and allowing the mixture to harden.

In carrying out the above method it is desirable to include a bentonite clay in the second slurry as a suspension agent, both for the components of the second slurry and for the whole composition when the two slurries are mixed together. Usually the quantity of bentonite used will be in the range of from 10.0 to 25.0% by weight based on the weight of beta anhydrite present. It may also be desirable to include in the second slurry a proportion of a known accelerating agent for cements such as lithium carbonate in order to increase the rate of strength development during the early stages of the hardening process when the two slurries are mixed together. The quantity of lithium carbonate is preferably up to 0.5 by weight based on the weight of cement component.

The present invention includes a dry powder comprising a cement component comprising at least one cement phase which has a C:A ratio greater than unity and a reactive source of silica, the cement phase being preferably ferrite and/or $C_{12}A_7$; and a slurry comprising the dry powder and water.

In order that the invention may be well understood it will now be described with reference to the following example in which parts are by weight unless otherwise specified.

EXAMPLE

A first powder was made by mixing together:

| a high alumina cement comprising the following phases (normalised to 100%) | | |
|---|---|---|
| Ferrite | 54 | |
| CA | 23 | |
| $C_{12}A_7$ | 14 | 80.00 |
| $C_2AS$ | 9 | |
| ground granulated blast furnace slag | | 20.00 |

To this mixture was added 2.75 parts of a retarding-/suspending system. A second powder was made by mixing together:

| | |
|---|---|
| beta anhydrite | 74.75 |
| sodium bentonite | 10.00 |
| calcium oxide | 6.0 |
| pulverised fly ash | 5.0 |
| calcium sulphate dihydrate | 3.0 |
| sodium carbonate | 1.0 |
| lithium carbonate | 0.25 |

Each powder was thoroughly mixed with water at 20° C. in a water:solids ratio of 2.5:1 to form a slurry. After 5 minutes the two slurries were intermixed by pouring from one bucket to another six times. The mixed slurries were then poured into insulated 100 mm cube moulds to simulate underground curing conditions.

A comparative mixture was made up using the same slurries but following the teaching according to GB patent 2123808 B but including 20 parts relative to the HAC of the blast furnace slag used above. The HAC comprised (normalised to 100%):

| | |
|---|---|
| CA | 46 |
| Ferrite | 23 |
| $C_{12}A_7$ | 20 |
| $C_2AS$ | 11 |

The cubes from both slurries were then tested for comparative strengths and the following results were obtained:

| | Present invention | GB 2123808 (& 20 parts slag) |
|---|---|---|
| 2 hours | 1.29 | 0.65 |
| 24 hours | 4.16 | 1.63 |
| 7 days | 4.73 | 3.57 |

These results show that by modifying the cement component and adding a reactive source of silica an acceptable rate of strength development is obtained. When, however, the reactive source of silica is added to an HAC in the system of the earlier patent no such rate of strength development occurs.

We claim:

1. A two part composition for use in making a hardened cement, the composition comprising first and second slurries, the first slurry comprising water, a reactive source of silica and a cement component, the cement component comprising the phases ferrite and $C_{12}A_7$ or ferrite and $C_{11}A_7CX_2$ (where X is a halogen), the phases making up at least 50% by weight of the cement component, the reactive source of silica being present in a weight ratio of 0.1 to 0.6:1 of the cement component, the second slurry comprising water, beta anhydrite, and a calcium compound selected from the group consisting of calcium oxide and calcium hydroxide.

2. A composition according to claim 1, wherein the ferrite and $C_{12}A_7$ or $C_{11}A_7CX_2$ make up 65 to 85% by weight of the cement component of the first slurry.

3. A composition according to claim 1, wherein the reactive source of silica in the first slurry is selected from a blast furnace slag, pozzolan, pulverized fly ash, silica fume or other glass mixtures of lime and silica.

4. A composition according to claim 1, wherein the quantity of the calcium compound selected from the group consisting of calcium oxide and calcium hydroxide in the second slurry is from about 4% to about 8% by weight of the cement component.

5. A composition according to claim 1, wherein the second slurry contains about 1% to about 6% by weight of a partially water soluble calcium sulphate.

6. A composition according to claim 1, wherein the second slurry contains 10% to 25% by weight relative to the beta anhydrite of a bentonite clay.

7. A dried powder formulation comprising a reactive source of silica and a cement component consisting essentially of ferrite and $C_{12}A_7$ or ferrite and $C_{11}A_7CX_2$ (where X is a halogen atom) and wherein said reactive source of silica is present in a weight ratio 0.1 to 0.6:1 of the cement component.

8. A method of making a hardening cement, the method comprising mixing together first and second slurries, the first slurry comprising water, a reactive source of silica and a cement component, the cement component comprising the phases ferrite and $C_{12}A_7$ or $C_{11}A_7CX_2$ (where X is a halogen), the phases making up at least 50% by weight of the cement component, the second slurry comprising water, beta anhydrite, and a calcium compound selected from the group consisting of calcium oxide and calcium hydroxide.

9. A method according to claim 8 including the step of including the ferrite and $C_{12}A_7$ in sufficient quantity to make up 65 to 85% by weight of the cement component of the first slurry.

10. A method according to claim 8, including the step of selecting as the reactive source of silica of the first slurry a substance from the group of a blast furnace slag, a pozzolan, pulverized fly ash, silica fume or other glassy mixtures of lime and silica.

11. A method according to claim 10, including the step of adding the reactive source of silica in a weight ratio of 0.1 to 0.6:1 of the cement component.

12. A method according to claim 18, including adding the quantity of the calcium compound in the second slurry in a ratio of from about 4% to about 8% by weight of the cement component.

13. A method according to claim 18, including adding a partially water soluble calcium sulphate in a concentration in the second slurry of about 1% to about 6% by weight.

14. A method according to claim 13, including bentonite clay in a concentration of from 10% to 25% by weight relative to the beta anhydrite in the second slurry.

* * * * *